United States Patent [19]

Proksa

[11] Patent Number: 4,489,023
[45] Date of Patent: Dec. 18, 1984

[54] METHOD OF AND AN INSTALLATION FOR THE CONTINUOUS PRODUCTION OF BLOCK-FOAM

[75] Inventor: Ferdinand Proksa, Leverkusen, Fed. Rep. of Germany

[73] Assignee: Maschinenfabrik Hennecke GmbH, Leverkusen, Fed. Rep. of Germany

[21] Appl. No.: 501,471

[22] Filed: Jun. 6, 1983

[30] Foreign Application Priority Data

Jun. 19, 1982 [DE] Fed. Rep. of Germany ....... 3222959

[51] Int. Cl.³ .............................................. B29D 27/04
[52] U.S. Cl. ..................................... 264/54; 264/101; 264/338; 264/DIG. 84; 425/89; 425/224; 425/817 C
[58] Field of Search .................... 264/DIG. 84, 51, 54, 264/338, 101; 425/89, 224, 817 C

[56] References Cited

U.S. PATENT DOCUMENTS

| | | | |
|---|---|---|---|
| 3,729,534 | 4/1973 | Ferstenberg | 264/DIG. 84 |
| 3,786,122 | 1/1974 | Berg | 264/47 |
| 3,870,441 | 3/1975 | Petzetakis | 425/4 C |
| 3,972,667 | 8/1976 | Hanusa | 264/DIG. 84 |
| 4,005,958 | 2/1977 | Porter | 425/89 |
| 4,099,280 | 7/1978 | Hoppe et al. | 114/357 |
| 4,120,626 | 10/1978 | Keller | 264/51 X |
| 4,150,075 | 4/1979 | Schmitzer et al. | 264/51 X |
| 4,222,722 | 9/1980 | Bokelmann | 264/DIG. 84 |
| 4,252,757 | 2/1981 | James et al. | 264/DIG. 84 |
| 4,260,353 | 4/1981 | Buchert et al. | 264/DIG. 84 |

*Primary Examiner*—Philip Anderson
*Attorney, Agent, or Firm*—Gene Harsh; Joseph C. Gil

[57] ABSTRACT

In the continuous production of block-foam from liquid reaction components, the danger of over-rolling exists in installations having low throughputs and in installations having high throughputs, which over-rolling results in faults in the finished block. These over-rolling phenomena are avoided by providing a conveyor belt in the mixture charging zone which belt transports on its conveying surface a foil which has trough-shaped indentations which can correspond to trough-shaped indentations in the conveying surface. The reaction mixture is portioned into the indentations of the foil. These portions are only spread out once the reaction mixture has reached the creamy phase.

10 Claims, 11 Drawing Figures

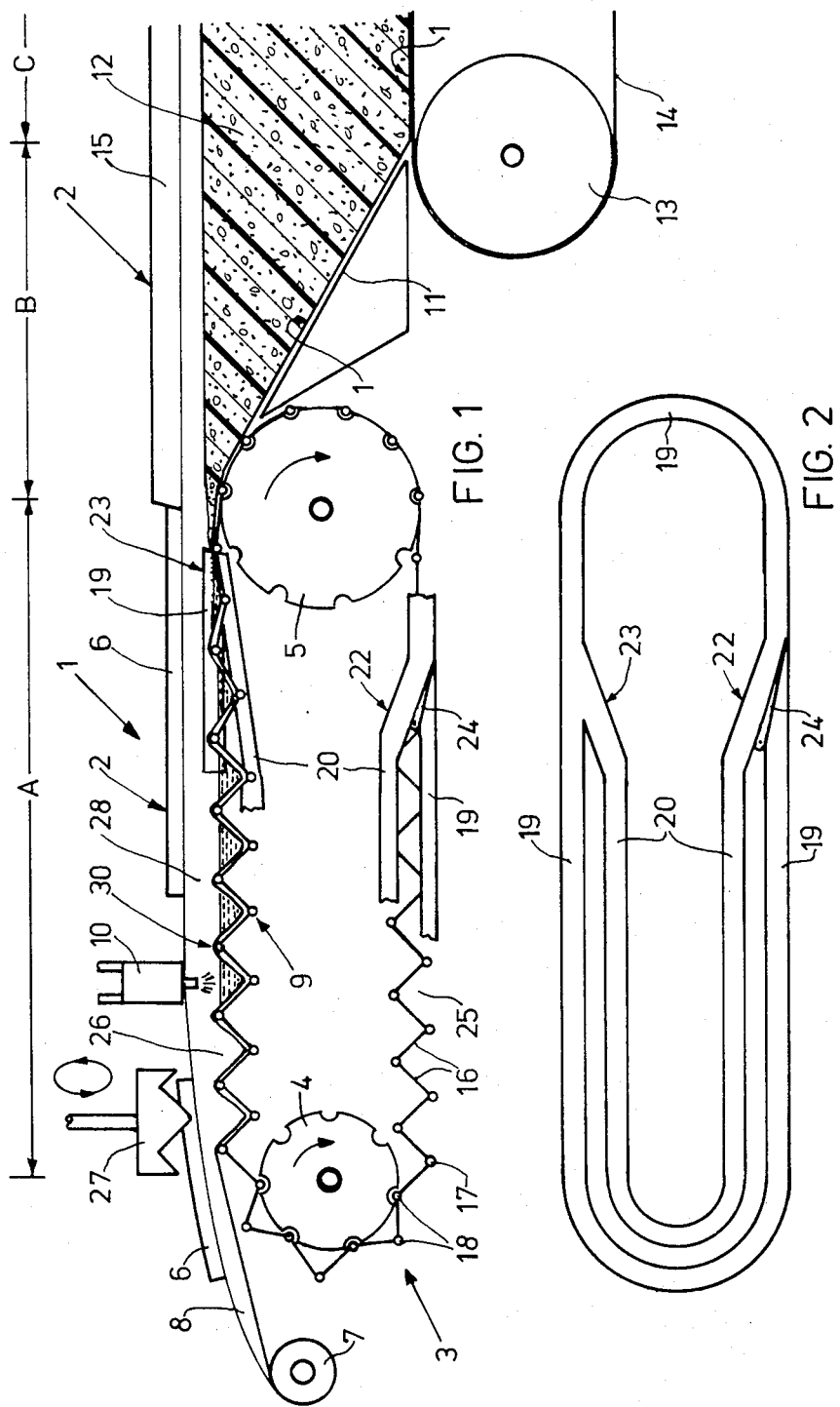

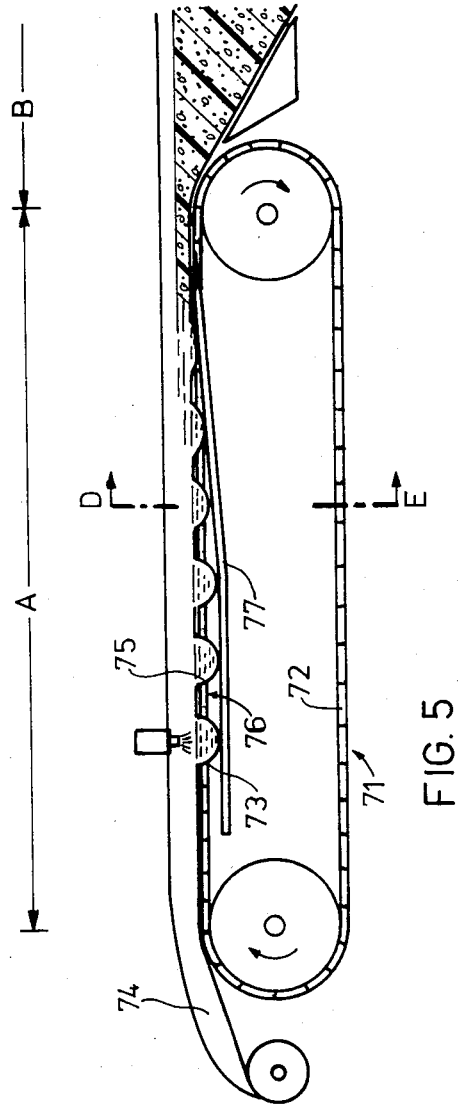
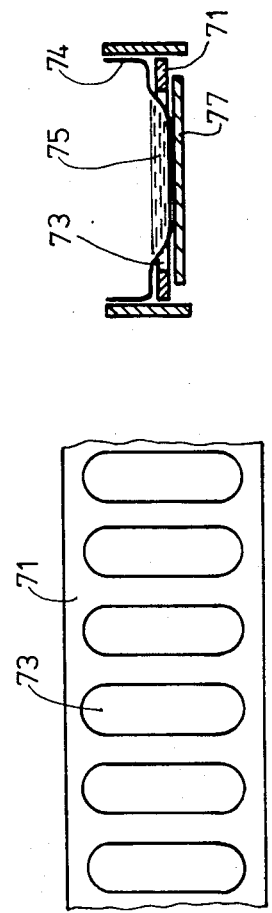
FIG. 5
FIG. 6
FIG. 7

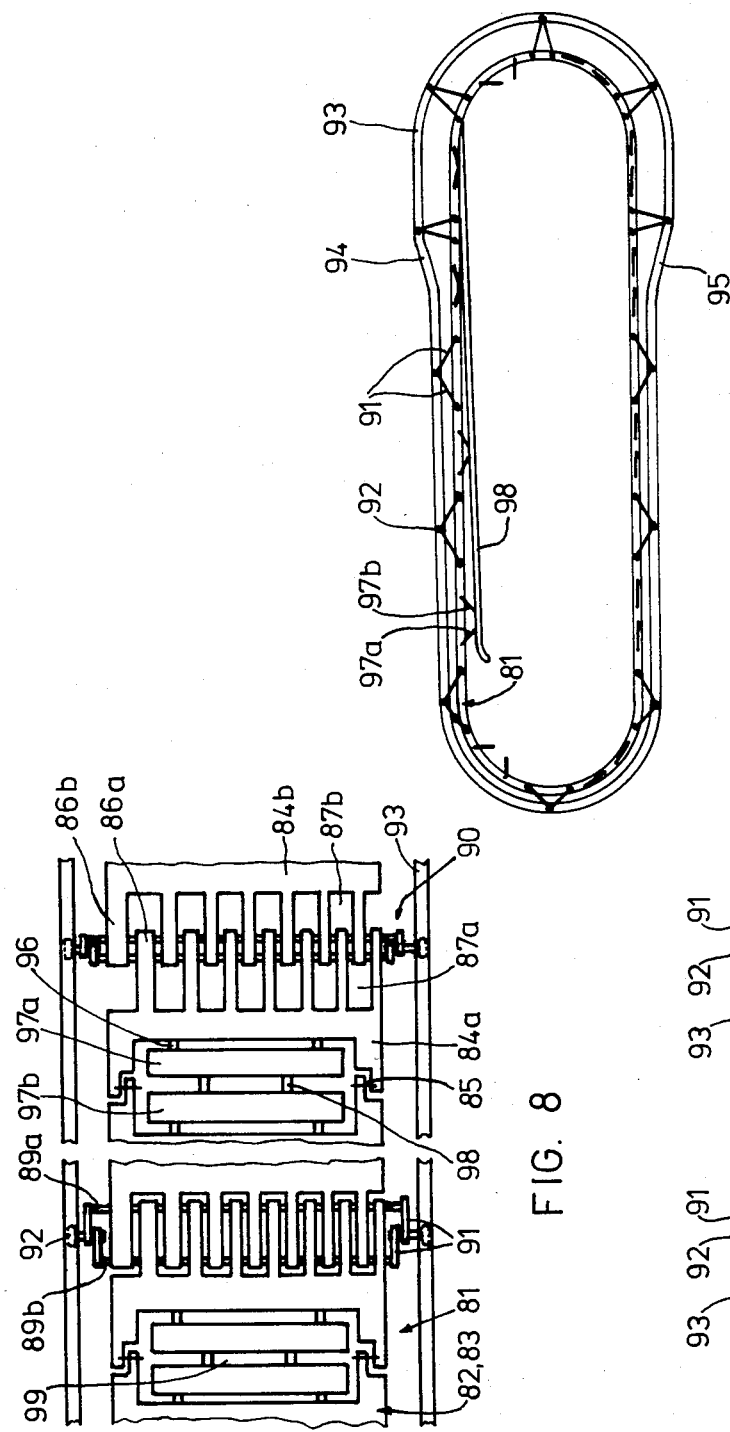

METHOD OF AND AN INSTALLATION FOR THE CONTINUOUS PRODUCTION OF BLOCK-FOAM

BACKGROUND OF THE INVENTION

The present invention relates to a method of and an installation for the continuous production of block-foam. In the method, a reaction mixture produced from at least two foam-forming, liquid reaction components is applied to a foil conveyed on a moving support with the formation of a closed, laterally restricted layer. The reaction mixture then changes from a liquid condition into a creamy condition. Finally, the mixture completely reacts into a foam block with the resultant enlargement of the volume.

In the continuous production of block-foam, an equilibrium condition exists at the beginning of the foaming-up region. The mixture delivered to the foil rises without a relative movement parallel to the foil, to form the foam block. This equilibrium is extremely unstable because there is the danger that the applied mixture will flow under (or underscour) the mixture which has already started to foam. Additionally, even the previously applied mixture may flow back against the direction of transport. This over-rolling of differently aged reaction mixture results in faults in the final foam which are visible in the cross-section of the completely reacted foam block in the form of sections of a varying density or cell size, streaks or even cracks.

The only way of countering this over-rolling is by maintaining a certain minimum conveying speed, dependant also on the other parameters.

For this reason, small installations (i.e., those which are to operate with a low throughput) become uneconomical because a relatively long foaming zone and hardening zone must be provided for a desired block height, due to the low speed. This necessarily implies a high mechanical expense and a considerable requirement of space.

Similar difficulties arise in the case of large installations (i.e., installations with a high through-put which in particular produce blocks above the conventional height of from 1 to 1.20 m). Overrolling takes place in this case because the reaction mixture cannot be supplied in a sufficiently high, stationary layer, without the over-rolling phenomena occurring as the result of the strong flow.

To solve this problem, it has been proposed (see U.S. Pat. No. 3,786,122) to connect a trough upstream of the actual foaming region. The reaction mixture is supplied to the bottom of the trough, starts to react, and finally flows away, over a weir, into the actual foaming region. As a result of varying the height of the weir over its width, the overflow of the reaction mixture which is starting to react may be controlled so that a foam block having a rectangular cross-section forms.

However, the glass contained in the reaction mixture or gases which are produced by the reaction itself cannot penetrate the mixture column towards its outer surface during this intermediate storage of the reaction mixture in the trough, because the reaction mixture which is on the surface has already reacted to such an extent that it has too high a viscosity. Consequently, gas bubbles remain in the initially reacted mixture, and can no longer escape. This will necessarily finally adversely affect the homogeneity of the finished block.

According to another proposal (U.S. Pat. No. 4,005,958), the flow of a mixture which is applied as a film and is still in a liquid condition is braked by several retaining weirs. Each weir forms an overflow, in front of which mixture builds up so that the individual particles of mixture have a different residence time in each build-up. In particular, there is also the danger of the reaction mixture flowing back on the surface, so that the age spectrum of the mixture is widened to an even greater extent. The disturbances which have been mentioned and inferior physical properties of the foam also occur as a result of this. A disadvantage is also seen in the fact that the base foil cannot be guided over the weirs. After each standstill, the zone of the retaining weirs has to be cleaned of completely reacted reaction mixture.

Thus, the object of the present invention is to continuously produce block-foam by a suitable method in an installation which is designed for either low throughput or a high throughput and in particular for the production of high blocks, to obtain a product having a homogeneous foam structure, i.e. a streak-, crack- and bubble-free product which has optimum physical properties.

BRIEF DESCRIPTION OF THE DRAWINGS

FIG. 1 illustrates a small installation (installation having a low throughput) in longitudinal section, FIG. 2 illustrates the arrangement of the guide rails in a side view, FIG. 5 illustrates the charging zone of a third installation in a side view, FIG. 6 illustrates the charging zone of the installation according to FIG. 5 in a top view, FIG. 7 illustrates a section along line D-E in FIG. 5, FIG. 8 is a sketch of a conveyor belt of a transport belt arranged in the charging zone of an installation, in a top view, FIG. 9 illustrates a distance changing member for the installation according to FIG. 8 in a side view, FIG. 10 illustrates this distance changing member in a representation shortening the conveyor belt, and FIG. 11 illustrates the arrangement of the guide rails for this installation in a separate representation.

DESCRIPTION OF THE INVENTION

Figure 3:
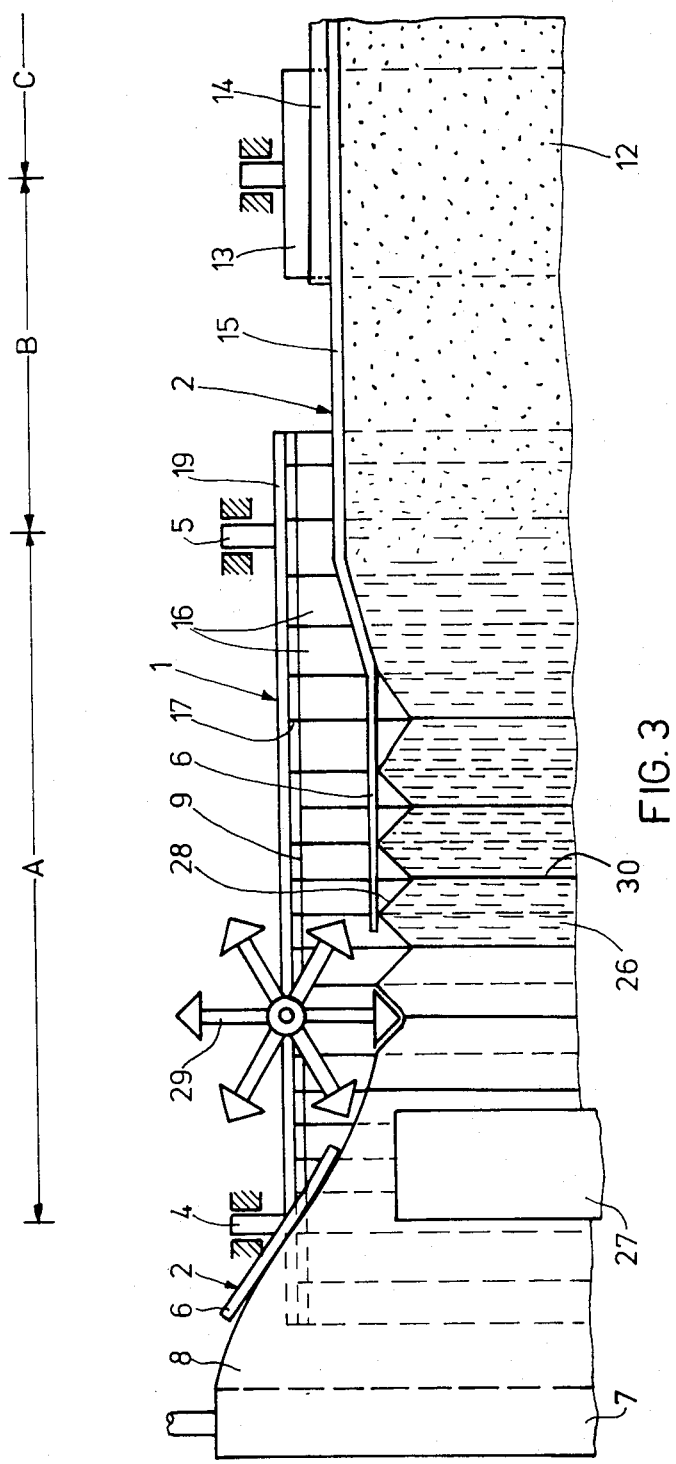
FIG. 3 illustrates the installation according to FIG. 1 in a top view.

The object is achieved by a method which is characterized in that the reaction mixture is divided into portions. The individual portions are successively guided under constraint and the successive portions are only combined together to form a closed layer once the reaction mixture therein has become creamy.

In this way, each portion is conveyed separately from the charging point up to the initial region of the foaming zone. The relative movement which could result in over-rolling or underscouring phenomena is thereby greatly reduced or even eliminated depending on the portioning degree. The age difference between two successive portions is particularly small if the individual portions are relatively small, i.e. if many small portions are conveyed per unit of time instead of fewer large portions with the same mixture throughput. The number of portions necessary for the production of a homogeneous foam essentially depends on the rate of reaction of the mixture and on the speed of the belt. It is obvious that the portions should be combined to form a closed layer in such a manner that they flow together, but do not flow over each other. This may be effectively achieved if the transition from the portions to the closed layer is slow enough. The particular advantage of this method lies in the narrow age spectrum. Each adjacent portion consists of mixture of practically the same age. Additionally, each portion transversely to the conveying direction is substantially the same age. In the present invention, each portion can only come into contact with the mixture of the portion which has previously been spread out to form a layer. The broad age spectrum of the particles of the mixture which prevailed in the previously known use of troughs and weirs in any cross-section is substantially eliminated in the present invention. Consequently, optimum and reproducible physical properties of the resulting foam are ensured.

As is generally known, a paper or plastic web (which is supplied moving according to the production speed and is wider than the final block width) is used as the foil. The remaining side sections must be wide enough so that when they are raised, they are at least as high as the foamed block. Instead of using a single foil for the bottom and side boundaries, several, e.g., three foils can be used which overlap in a known manner. Alternatively, the foil may be a permanent component of the moving support. However, in this case, the foil must be made of a material or is covered with a material to which the reaction mixture or the resulting foam cannot adhere, for example silicone or polytetrafluoroethylene. (Since there are still considerable difficulties in keeping such foils clean, they have not generally been used commercially.)

According to one particular embodiment, the foil is shaped into troughs which extend transversely to the conveying direction. Into each trough is introduced a portion of reaction mixture. The troughs are then reflattened by reverse shaping of the foil.

The portions may also be transported in containers and then poured onto the foil at the beginning of the foaming zone, where the mixture starts to become creamy. It would be possible to position partition walls above the foil which move therewith and are raised again later on. Since in this case cleaning the emptied troughs and cleaning the partition walls would be of concern, this particular embodiment is not preferred.

Various possibilities are available for shaping the foil to form troughs. According to a first method, the foil is shaped by folding the moving support transversely to the conveying direction. According to a second embodiment, shaping is caused by the weight exerted by the portions. According to yet a third embodiment, the foil is shaped by elastic stretching. It is obvious that the three variants may also be combined together, and that additional possibilities exist.

Since the troughs must be present or created at the mixture charging point, though they must have disappeared (or they must be disappearing) at the start of the foaming zone, it is generally necessary that in the case of a non-elastic foil, the troughs will have to be formed by gathering up in any suitable manner. In the case of extensible foils, such a gathering-up operation will only be necessary to the extent that the extensibility is insufficient for the formation of the troughs. Thus, if the foil is gathered up or is at least partly gathered up to form the troughs, then the support will have to be restretched correspondingly to the degree of gathering up in order to flatten the troughs. If the foil is not elastic, the side boundaries of the troughs will have to be formed by correspondingly folding up this foil. However, if necessary, side strips which have been shaped may also be used. These side strips are substantially adapted to the cross-sectional contour of the troughs and adhere to the foil in a sealing manner (optionally, by an adhesive joint) until they are drawn off again at the start of the foaming zone, where the portions of reaction mixture are combined to form a layer. Such additional side strips could be covered on their side facing the trough with a release layer, such as silicone or polytetrafluoroethylene, to prevent losses of reaction mixture.

The troughs may have various cross-sectional shapes, i.e. the cross-section of successive troughs may form, for example a triangular line, a trapezoidal line or a sine curve. The troughs should extend substantially over the width of the foam and should be designed such that the desired layer forms over the complete width of the foil as rapidly as possible, but without too strong a flow of the portioned mixture. Moreover, it may be appropriate to design troughs differing in width and/or in depth, seen over the foam width, in order to deliberately promote an irregularly thick layer formation, or to promote the spreading out during the layer formation.

The installation for implementing the method proceeds from a transport path having side boundaries, in which installation the transport path
  (a) is guided through a mixture charging zone having a reaction mixture charging apparatus, through a foaming zone and a hardening zone,
  (b) consists of an endless conveyor belt at least in the region of the mixture charging zone, and
  (c) is covered by an entrained foil which also extends onto the side boundaries.

The novelty is seen in the fact that the foil, in the mixture charging zone, has trough-shaped indentations which extend transversely to the conveying direction, whereas it is flat at the beginning of the foaming zone.

This foil must be considered as a component of the installation, even if it is supplied continuously and thus is renewed continuously. In addition to the design possibilities of the foil which have already been described, a foil of deep-drawable and heat-shrinkable plastics may also be used. Suitable troughs can then be molded by deep-drawing before the foil is positioned on the conveyor belt, or while it is being positioned thereon, which troughs are to be reflattened in the foaming region by heat-induced shrinkage.

Suitable indentations in the transport path of the conveyor belt are preferably provided for the indentations in the foil. The transport path is at least approximately flat at the beginning of the foaming zone.

The design of the conveyor belt will depend on the properties of the foil, i.e. whether it is sufficiently elastic or partly elastic, or non-extensible.

According to a particular embodiment, the indentations in the transport path of the conveyor belt consist of cutout sections. A rising surface which ascends in the conveying direction is provided below the upper strand of the conveyor belt upstream of the foaming zone. This embodiment is particularly suitable for the use of elastic foils, but is also suitable for the use of non-extensible foils if the cutout sections are designed such that the troughs are automatically formed by the weight of the reaction mixture portions which are being introduced. The trough which sags like a sack is then pressed up again by the rising surface. However, a slight unevenness which corresponds to the thickness of the plates of the conveyor remains in this case. Thus, this embodiment should only be used if the conveyor belt terminates at the beginning of the foaming zone, so that a flat support is directly joined thereto which ensures a regular layer thickness on the foil. This means that the leveling will take place behind the run-out end of the conveyor belt. It is quite possible to arrange the installation or to adjust the conveying speed such that the moment favorable to the distribution of the mixture is only reached in the region of the completely flat support. The perfect formation of an evenly thick layer is thereby ensured.

In order to achieve a particularly favorable distribution of the mixture, the rising surface may be shaped in a known manner or adjusted accordingly, for example by a varying curvature, in the conveying direction and in the transverse direction thereto. The mixture distribution may be influenced in a particularly advantageous manner if the rising surface comprises several individually adjustable elements in a manner known in the art (see, e.g., U.S. Pat. No. 4,120,626).

Frames which are guided in a telescoping manner and which surround a base may be positioned in the cutout sections. This arrangement allows the use of foils which could otherwise tear under the weight of the reaction mixture portion. Moreover, they have the advantage that with a suitable design of the telescopic frame or of the arrangement of the base, this base forms a closed plane with the conveyor belt.

Bases which may be moved about pivoting axes may also be provided in the cutout sections. The pivoting axes are preferably located on the front edge and/or on the rear edge of the cutout sections, so that the base is formed in each case by one or two flaps, the free edges of which slide up to the rising surface which is extended in front of the mixture charging point. It is obvious that several individual flaps may be provided, seen over the foam width, to allow a deliberately different movement of the flaps with a corresponding design of the rising surface.

According to one particular embodiment, a gathering up device upstream of the mixture charging zone, and a stretching device upstream of the foaming zone are provided to the transport path of the conveyor belt. These devices are necessary when non-extensible or insufficiently extensible foils are used. In this case, at least the upper strand of the conveyor belt, i.e. the conveying surface, must be gathered up upstream of the mixture charging point and stretched again upstream of the foaming zone. Several embodiments are available for the operations of gathering up and stretching.

The indentations in the conveyor belt preferably consist of folds in the conveying surface. Such folds have the shapes of, for example, a zig-zag line or a trapezoidal line. For folding up, i.e. for gathering up the conveyor belt, a deflection roller on the inlet side can be provided with suitable gripping arms which, during the revolving motion, gather up the individual plates of the belt which are movably interconnected. The deflection roller can push guide rollers which are provided into corresponding guide rails and/or the folds can be secured in their position relative to each other with grippers. Before or at the beginning of the foaming zone where the reaction mixture is already changing into a creamy condition, the guide rails are then guided, or the grippers are released, such that the conveyor belt may again be stretched into a plane. The use of folds of this type has the particular advantage that a suitably pre-shaped trough is provided in the foil during the trough formation, which trough only needs to be lined. If necessary, supporting elements may be provided for the side boundary of the troughs.

According to another preferred embodiment, the transport path has distance changing members between the recesses. This embodiment is also particularly advantageous when non-extensible foils are used. The distance changing members are used upstream of the mixture charging point to shorten the conveyor belt or the transport surface, whereas before or at the beginning of the foaming region they again allow a corresponding stretching. These distance changing members comprise, for example, an engaging toothing of two adjacent plates, wherein the mutual engagement depth of the teeth may be changed corresponding to the necessary stretching or gathering up. In this arrangement, the tooth width should be kept so small that when a distance changing member is stretched, the foil cannot sag or cannot substantially sag into the gaps which have formed in order to ensure an even thickness of the mixture layer.

Molding devices may be provided to promote the trough formation of the foil. The main component of such a molding device comprises, for example, a die which is adapted to the desired trough shape and with which the foil is pressed in each case into the indentations of the conveyor belt. If the indentations of the conveyor belt consist of cutout sections, it is also possible to design the molding device as suction cups to be positioned on the foil from the reverse side of the conveyor belt. The suction effect may be stopped again if the portion of reaction mixture which has been introduced has a sufficient weight to thereby retain the trough which has formed, or until the trough is to be flattened again.

It may be appropriate particularly for installations having a low throughput to provide a single conveyor belt on which the block is transported, optionally under a slight incline, until it has sufficiently hardened.

To produce high foam blocks (i.e., in installations having a high throughput) it is advantageous to provide a separate conveyor belt for the charging region of the mixture up to the beginning of the foaming region, i.e. up to the creamy condition of the reaction mixture, and to join an inclined sliding surface to this conveyor belt which extends over at least a part of the foaming zone, and finally for another conveyor belt to join this surface, the length of which substantially corresponds to the necessary hardening zone. It is possible and is even appropriate in the production of high foam blocks to add a known rectangular block apparatus (U.S. Pat. No. 4,150,075) to the installation.

Several embodiments of the new installation are illustrated in a purely schematic manner in the drawings and will be described in more detail in the following.

The small installation in FIGS. 1 to 3 comprises a transport path 1 having side boundaries 2. The transport path 1 is guided through a mixture charging zone A, a foaming zone B and a hardening zone C. It is obvious that the transitions from one zone A, B into the other zone B, C are continuous in practice.

In the individual zones A, B and C, the transport path 1 comprises different elements. In the mixture charging zone A, it is formed by an endless conveyor belt 3 which revolves over deflection rollers 4 and 5. In this zone, the side boundaries 2 comprise supporting sheets 6. An unwinding station 7 for a base and side foil 8 is positioned on the inlet side upstream of the conveyor belt 3. A reaction mixture charging apparatus 10 (mixing head) for the production of a foam-forming reaction mixture of polyol and isocyanate is provided above the upper strand 9 of the conveyor belt 3. In the foaming zone B, the transport path 1 is formed by an inclined plane 11, the angle of incline of which is adjusted such that the surface of the forming foam block 12 runs substantially horizontally, taking into effect the conveying speed of the installation and the foaming rate of the reaction mixture. Another endless conveyor belt 14 which revolves over deflection rollers 13 is provided in the hardening zone C. Side walls 15 which are attached to a frame (not shown) are positioned as a side boundary 2 to the inclined plane 11 and the conveyor belt 14. The conveyor belt 3 comprises individual panels 16 which are hinged together by pivot pins 17. The ends of the pivot pins 17 are provided with rollers 18. The rollers 18 run in guide rails 19, 20 which are positioned on both sides of the conveyor belt 3 and which form a gathering up device 22 designed as a switch by branching in the region of the lower strand 21 of the conveyor belt 3, and form a stretching device 23 by joining in the region of the upper strand 9. This stretching device 23 is positioned upstream of the foaming zone B, where the reaction mixture has already started to react and is in a creamy condition. The gathering up device 22 causes the panels 16 to fold up. The rollers 18 of each second pivot pin 17 are introduced in each case into the inside guide rails 20 by switch tongues 24, while the rollers 18 of the other pivot pins 17 only rotate in the outer guide rails 19. The folding-up action produces trough-shaped indentations 25 which extend transversely to the conveying direction. The indentations 25 are flattened again by the stretching device 23 by laying the panels 16 flat. In order to provide the base and side foil 8 with trough-shaped indentations 26, a molding device 27 designed as a die is positioned above the upper strand 9. Its movement is adapted to the transporting speed of the conveyor belt 3. Molding devices 28 (see FIG. 3) which are designed as striking wheels (one only being shown) are provided to form the wide walls 28 of the trough-shaped indentations 26. Supporting sheets 6 are used to stabilize or to guide the side walls 28. An equal portion of reaction mixture is introduced into each indentation 26. The level of these portions remains below the vertices 30 which are formed between the indentations 26. Only in the region of the stretching device 23 are the portions spread out to form an evenly thick film by levelling the indentations 25, 26, the reaction mixture now already being in the cream phase. The viscosity of the creamy reaction mixture prevents over-rolling when the portions flow together, and thus also prevents faults in the finished block 12. Foaming in zone B and hardening of the block 12 in zone C takes place in a known manner.

Figure 4:
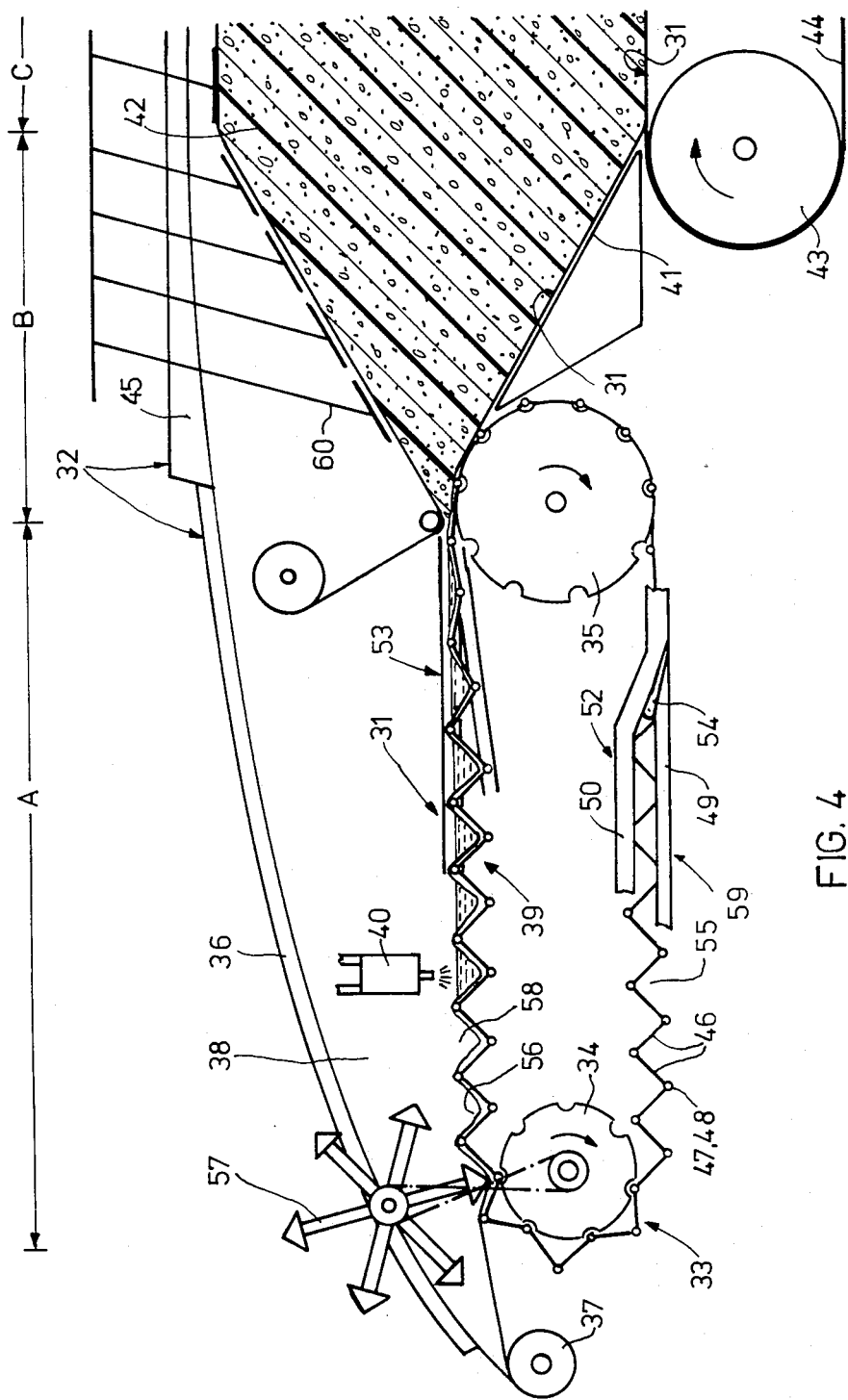
FIG. 4 illustrates a large installation (installation having a high throughput for the production of high blocks) in longitudinal section.

The large installation in FIG. 4 for the production of high blocks comprises a transport path 31 having side boundaries 32. The transport path 31 is guided through a mixture charging zone A, a foaming zone B and a hardening zone C. It is obvious that the transitions from one zone A, B into the other zone B, C are continuous in practice. The transport path 31 comprises different elements in the individual zone A, B and C. In the mixture charging zone A, it is formed by an endless conveyor belt 33 which turns over deflection rollers 34 and 35. In this zone, the side boundaries 32 comprise supporting sheets 36. An unwinding station 37 for a base and side foil 38 is positioned on the inlet side upstream of the conveyor belt 33. A reaction mixture charging apparatus 40 (mixing head) for the production of a foam-forming reaction mixture of polyol and isocyanate is provided above the upper strand 39 of the conveyor belt 33. In the foaming zone, the transport path 31 is formed by an inclined plane 41, the angle of incline of which is adjusted such that it corresponds generally to a mirror image of the profile of the surface of the forming foam block 42. Another endless conveyor belt 44 which revolves over deflection rollers 43 is provided in the hardening zone C. Side walls 15 which are attached to a frame (not shown) are positioned as a side boundary to the inclined plane 41 and the conveyor belt 44. The conveyor belt 33 comprises individual panels 46 which are hinged together by axles 47. The ends of the axles 47 are provided with rollers 48. These rollers 48 run in guide rails 49, 50 which are positioned on both sides of the conveyor belt 33 and which form a gathering up device 52 designed as a switch, by branching in the region of the lower strand 51 of the conveyor belt 33, and form a stretching device 53 by joining in the region of the upper strand 39. This stretching device 53 is positioned upstream of the foaming zone B, where the reaction mixture has already started to react and is in a creamy condition. The gathering up device 52 causes the panels 46 to fold up, in that the rollers 48 of each second axle 47 are introduced in each case into the inside guide rails 50 by reversible switch tongues 54, while the rollers 48 of the other axles 47 only rotate in the outer guide rails 49. The folding-up action produces trough-shaped indentations 55 which extend transversely to the conveying direction. The indentations 55 are levelled again by the stretching device 53 by laying the panels 46 flat. In order to provide the base and side foil 38 with trough-shaped indentations 56, a molding device 57 which is designed as a striking wheel is positioned above the upper strand 39. Its movement is adapted to the transporting speed of the conveyor belt 33. Molding devices which are designed as striking wheels (not shown), and which correspond to those according to reference numeral 29 in FIG. 3, can be provided to form the side walls 58 of the trough-shaped indentations 56. Supporting sheets 36 are used to stabilize or to guide the side walls 58. A portion of reaction mixture is introduced into each indentation 56. The indentations 56 can be filled above the interlying vertices 59, so that only some of the supplied reaction mixture is portioned (according to the volume of the troughs) and some of the reaction mixture is not portioned and covers the portions present in the troughs. Only in the region of the stretching device 53 are the portions spread out to form a film which is of an even thickness by flattening the indentations 55, 56, the reaction mixture already being in the cream phase. The viscosity which now prevails prevents over-rolling phenomena when the portions flow together and thus also prevents disturbances in the finished block 42. The foaming operation in zone B and the hardening operation of the block 42 in zone C takes place in a known manner. A so-called rectangular block apparatus 60 is positioned in the foaming zone B which acts to level the surface of the forming block 42.

In FIGS. 5 to 7, a conveyor belt 71 is provided in the charging zone A, the endless transport belt 72 of which has indentations 73 designed as cutout sections. An elastic foil is used as the base and side foil 74 which forms trough-shaped indentations 75 due to the weight of the portions changed into the cutout sections 73. A rising surface 77 which ascends in the conveying direction is provided below the upper strand 76 of the conveyor belt 71, on which surface 77 the trough-shaped indentations 75 are supported and are flattened again in the ascending part, and the foil 74 contracts again due to its elasticity. An evenly thick layer of reaction mixture is formed by the individual portions flowing together in the cream phase of the reaction mixture, i.e. just before the foaming zone.

FIGS. 8 to 11 illustrate the upper strand 81 of a conveyor belt 82 of a transport belt 83 positioned in the charging zone A. The belt 82 comprises cross panels 84a, 84b, of substantially the same design. The panels 84a, 84b are hinged together via joints 85 to form the conveyor belt 82. Teeth 86a, 86b of the panels 84a, 84b engage forming gaps 87a, 87b which are provided inbetween. The teeth 86a, 86b, have oblong holes 88a, 88b, through which cross bars 89a, 89b are guided. These bars terminate in distance changing members 90. Levers 91 and rollers 92 are also associated with distance changing member 90. The rollers run in guide rails 93. By a suitable choice of their spacing with respect to the surface of the conveyor belt 82, the distance changing members 90 contract the conveyor belt 82 or stretch it in a required manner for the portioning of or layer formation of the reaction mixture. This means that they form at the desired points a stretching device 94 and a gathering up device 95. Flaps 97a, 97b which are attached to hinges 96 and which slide on a rising surface 98 designed as two rails are positioned in the indentations 99. The operation is similar to that of the conveyor belt according to FIGS. 5 to 7.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a method of continuously producing block-foam comprising applying a reaction mixture produced from at least two foam-forming, liquid reaction components to a foil conveyed on a moving support with the formation of a closed, laterally restricted layer, allowing the reaction mixture to change into a creamy condition from a liquid condition, and finally completing the foaming reaction, the improvement wherein at least a part of the reaction mixture is charged in portions to said foil, the individual portions being successively guided and wherein the successive portions are only combined together to form a closed layer once they have become creamy, and further characterized in that the foil is formed into troughs which extend transversely to the conveying direction, and into each of which a portion of reaction mixture is introduced, and the troughs are flattened again by a reverse shaping procedure.

2. The method of claim 1, characterized in that the foil is shaped by folding the moving support transversely to the conveying direction.

3. The method of claim 1, characterized in that shaping is caused by the weight exerted by the portions.

4. The method of claim 3, characterized in that the foil is shaped by elastic stretching.

5. An installation for producing block-form comprising a transport path having side boundaries wherein the transport path
    (a) is guided through a mixture charging zone having a reaction mixture charging apparatus, through a foaming zone and a hardening zone.
    (b) comprises an endless conveyor belt at least in the region of the mixture charging zone; and
    (c) is covered by a foil which also extends on the side boundaries characterized in that the foil has in the mixture charging zone trough-shaped indentations which extend transversely to the conveying direction, whereas said foil is flat at the beginning of the foaming zone.

6. An installation according to claim 5, characterized in that corresponding indentations in the transport path of the conveyor belt are provided for the indentations in the foil (8, 38, 74), and wherein the transport path is at least approximately flat at the beginning of the foaming zone (B).

7. An installation according to claim 6, characterized in that the indentations in the transport path of the conveyor belt consists of cutout sections, and a rising surface, which ascends in the conveying direction, is provided below the upper strand of the conveyor belt of the foaming zone.

8. An installation according to claim 6, characterized in that a gathering up device upstream of the mixture charging zone and a stretching device upstream of the foaming zone are provided in the transport path of the conveyor belt.

9. An installation according to claim 8, characterized in that the indentations in the conveyor belt consist of folds in the transport path.

10. An installation according to claim 6, characterized in that the transport path has distance changing members between the indentations.

* * * * *